US012649819B2

(12) United States Patent
Sage et al.

(10) Patent No.: US 12,649,819 B2
(45) Date of Patent: Jun. 9, 2026

(54) TECHNIQUE FOR FABRICATION OF A LASER-ABLATION TARGET USING AN EPOXY MATRIX FOR SOURCES OF ATOMS AND MOLECULES

(71) Applicant: IonQ, Inc., College Park, MD (US)

(72) Inventors: Jeremy Matthew Sage, Acton, MA (US); Daniel Zambrano, Washington, DC (US); Jonathan Albert Mizrahi, Silver Spring, MD (US); Michael Lurie Goldman, University Park, MD (US); Marvin G. Warner, Richland, WA (US); Riane E. Stene, Richland, WA (US); Chris Barrett, Aiken, SC (US)

(73) Assignee: IonQ, Inc., College Park, MD (US)

( * ) Notice: Subject to any disclaimer, the term of this patent is extended or adjusted under 35 U.S.C. 154(b) by 753 days.

(21) Appl. No.: 18/062,930

(22) Filed: Dec. 7, 2022

(65) Prior Publication Data

US 2025/0313661 A1      Oct. 9, 2025

Related U.S. Application Data

(60) Provisional application No. 63/287,340, filed on Dec. 8, 2021.

(51) Int. Cl.
*C08G 59/18* (2006.01)
*C08J 3/20* (2006.01)
*G06N 10/60* (2022.01)

(52) U.S. Cl.
CPC .............. *C08G 59/18* (2013.01); *C08J 3/20* (2013.01); *G06N 10/60* (2022.01); *C08J 2363/00* (2013.01)

(58) Field of Classification Search
CPC ....... C08G 59/18; G21G 4/06; H01J 49/0418; C08J 2363/00; C08J 3/20

USPC ......................................................... 523/400
See application file for complete search history.

(56) References Cited

U.S. PATENT DOCUMENTS

| | | | |
|---|---|---|---|
| 2005/0142664 | A1 | 6/2005 | Loney |
| 2008/0054171 | A1 | 3/2008 | Bonn et al. |
| 2010/0320171 | A1 | 12/2010 | Mao et al. |
| 2018/0003735 | A1 | 1/2018 | Murray et al. |
| 2018/0147575 | A1 | 5/2018 | Khattak et al. |

FOREIGN PATENT DOCUMENTS

| | | |
|---|---|---|
| WO | 2021178038 A1 | 9/2021 |

OTHER PUBLICATIONS

"Characterization of barium titanate ceramics obtained by a chemical route after laser ablation", Materials Science and Engineering, vol. 45, Issues 1-3, Mar. 1997, pp. 17-24. (Year: 1997).*
International Search Report and Written Opinion in PCT/US2022/081177, mailed Jan. 22, 2024, 18 pages.
Extended European Search Report received for Patent Application No. 22946026.6, mailed on Nov. 17, 2025, 5 pages.
Leibrandt et al., "Laser Ablation Loading of a Surface-Electrode Ion Trap", Physical Review A, vol. 76, 2007, pp. 055403-1-055403-4.

* cited by examiner

*Primary Examiner* — Hannah J Pak
(74) *Attorney, Agent, or Firm* — ARENTFOX SCHIFF LLP

(57) ABSTRACT

Aspects of the present disclosure relate generally to systems and methods for use in the implementation and/or operation of quantum information processing (QIP) systems, and more particularly, to a technique for the fabrication of laser-ablation targets used in atomic sources for QIP systems that are based on atomic-based qubits.

20 Claims, 4 Drawing Sheets

TECHNIQUE FOR FABRICATION OF A LASER-ABLATION TARGET USING AN EPOXY MATRIX FOR SOURCES OF ATOMS AND MOLECULES

CROSS REFERENCE TO RELATED APPLICATIONS

The current application claims priority to, and the benefit of, U.S. Provisional Application No. 63/287,340 filed Dec. 8, 2021, and entitled "TECHNIQUE FOR FABRICATION OF A LASER-ABLATION TARGET USING AN EPOXY MATRIX FOR SOURCES OF ATOMS AND MOL-ECULES," the contents of the which are hereby incorporated by reference in its entirety.

STATEMENT AS TO RIGHTS TO INVENTIONS MADE UNDER FEDERALLY-SPONSORED RESEARCH AND DEVELOPMENT

This invention was made with Government support under Contract DE-AC0576RL01830 awarded by the U.S. Department of Energy. The Government has certain rights in the invention.

TECHNICAL FIELD

Aspects of the present disclosure relate generally to systems and methods for use in the implementation and/or operation of quantum information processing (QIP) systems, and more particularly, to a technique for the fabrication of laser-ablation targets used in atomic sources for QIP systems that are based on atomic-based qubits.

BACKGROUND

Trapped atoms are one of the leading implementations for quantum information processing or quantum computing. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

Moreover, ion trap quantum computing typically operates on a qubit register formed by a linear string of ions confined in a Paul trap. Each physical qubit is based on two internal levels of a single ion, defined within a Zeeman or hyperfine manifold, or corresponding to a forbidden optical transition. To date, qubits have been demonstrated in trapped ion hosts of all non-radioactive, alkaline-earth elements. These ions possess a simple electronic structure that facilitates straight-forward laser cooling as well as quantum state preparation, manipulation, and readout via electromagnetic fields. Among the alkaline-earthlike elements, only three (Cd, Hg, Yb) have naturally occurring isotopes with a nuclear spin $(I)=\frac{1}{2}$. Mercury and cadmium ions require lasers in the deep ultraviolet portion of the electromagnetic spectrum, making it difficult to integrate them into a large-scale ion trap architecture.

Since $^{171}Yb^+$ has the longest laser-cooling wavelength at 370 nm, it has been used extensively. However, even at this ultraviolet wavelength, the use of photonics infrastructure developed for visible and infrared light is limited. A possible remedy to these restrictions exists in the relatively stable, yet synthetic isotope of barium-133 ($t\frac{1}{2}=10.5$ years), which combines the advantages of many different ion qubits into a single system. $^{133}Ba^+$ has nuclear spin $I=\frac{1}{2}$, allowing fast, robust state preparation and readout of the hyperfine qubit, metastable D states, allowing ultrahigh fidelity readout, and long-wavelength transitions enabling the use of photonic technologies developed for the visible and near infrared spectrum.

With this in mind, it is important to develop new techniques that improve the design, fabrication, implementation, performance, and/or control of different QIP systems used as quantum computers or quantum simulators, and particularly for those QIP systems that handle operations based on atomic-based qubits.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

This disclosure describes various aspects of a technique for the fabrication of laser-ablation targets used in atomic sources for QIP systems that are based on atomic-based qubits. In this technique, the laser-ablation targets are fabricated using an epoxy matrix and can be used for sources of atoms or molecules.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

In a general aspect of the present invention, a method for fabrication of a laser-ablation target using an epoxy matrix for sources of atoms and molecules is provided. The exemplary method comprises placing an analyte into a receptable and determining the analyte amount, adding a known amount of one component of a multi-part epoxy, sonicating the analyte and the epoxy component mixture, preparing a target substrate with another component of the multi-part epoxy, combining a precise amount of the mixture with a component on the target substrate, mixing, and leaving for curing.

In another aspect of the present invention, the analyte is a source of barium.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
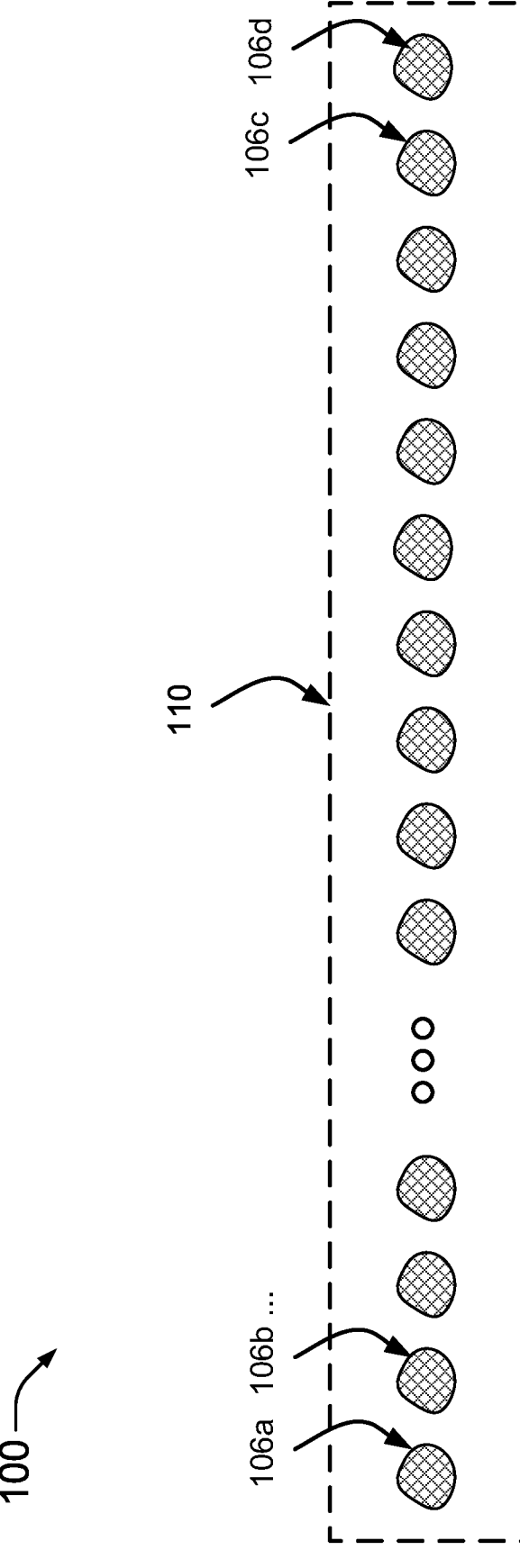
FIG. 1 illustrates a view of atomic ions a linear crystal or chain in accordance with aspects of this disclosure.

The detailed description set forth below in connection with the appended drawings or figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well known components are shown in block diagram form, while some blocks may be representative of one or more well-known components.

Sources of particular neutral or ionized atoms and molecules, which may be referred to as analytes, are often required in the vapor form to study the analyte properties outside of the solid or in liquid phase (e.g., mass spectrometry), or to act as a means for loading neutral-atom, neutral-molecule, and ion traps. Loading of such traps can prove necessary or advantageous for scientific exploration as well as for the generation of a register of quantum bits for quantum information processors (e.g., quantum computers) and for atomic and molecular clocks.

There exist several standard methods for generating these sources. Some of the most common include: (1) using some type of oven to heat a sample which contains the atom or molecule of interest above its evaporation temperature; and (2) firing an intense pulse of laser light on a sample to vaporize atoms or molecules in a small region around where the laser strikes the sample. This second method is referred to as ablation. While the oven technique is relatively simple, it suffers from the fact that it can take an undesirable amount of time to turn the source on and off due to the heat capacitance of the sample, which must be fully brought up to temperature or cooled down to turn the source on and off, respectively. In addition, when activated in an oven, the amount of evaporated material coming from the source cannot be precisely controlled since the vapor pressure is typically an exponentially sensitive function of the sample temperature. This is particularly challenging for small samples where sample longevity is required, or where samples contain precious/expensive analytes which must not be wasted or radioactive/toxic analytes which must be limited. The oven method also typically only produces sources of neutral atoms or molecules as opposed to ions (or a plasma), which is clearly not helpful if ions are desired.

The standard ablation method addresses some of the main shortcomings of the oven method. It only creates a source of atoms in a very short time window during and proceeding the ablation laser pulse, and typically material is only vaporized in the small region around where the laser beam hits the sample, or "target". As a result, the source can be turned on and off rapidly, and the amount of vaporized material can be well-controlled since laser beam sizes can be made small and can be finely adjusted via optics such as lenses. The ablation method is also able to produce a mixture of neutral atoms/molecules and ions which can be desirable depending on the application. It is important to note that the ratio of neutrals to ions can depend strongly on many factors, including the ablation laser pulse wavelength and intensity, as well as the particular molecular compounds in, and total mass of, the sample.

Standard ablation targets are typically bulk solids that are composed completely of the analyte, or else completely of molecular compounds that fragment to produce the analyte of interest upon ablation. Despite the advantages of ablation over ovens for sources, the ablation method has its limitations as well. For example, if the available analyte sample mass is limited, because of expense, preciousness, or allowable radioactivity or toxicity levels, a small number of ablation laser pulses (or even a single ablation pulse) can completely vaporize the target, which adversely affects its longevity. Another related drawback to the ablation method that uses standard targets is that it requires the target to be a macroscopic solid that can be straightforwardly fixtured into place and located and hit with a laser (as opposed to, say, a powder or mechanically fragile or unstable solid that could fall apart upon routine handling or during the ablation process itself). This severely limits the kinds of materials that can be used as targets, which is problematic because analytes of interest may be just the ones that are completely incompatible with the ablation method due to their mechanical instability.

Figure 2:
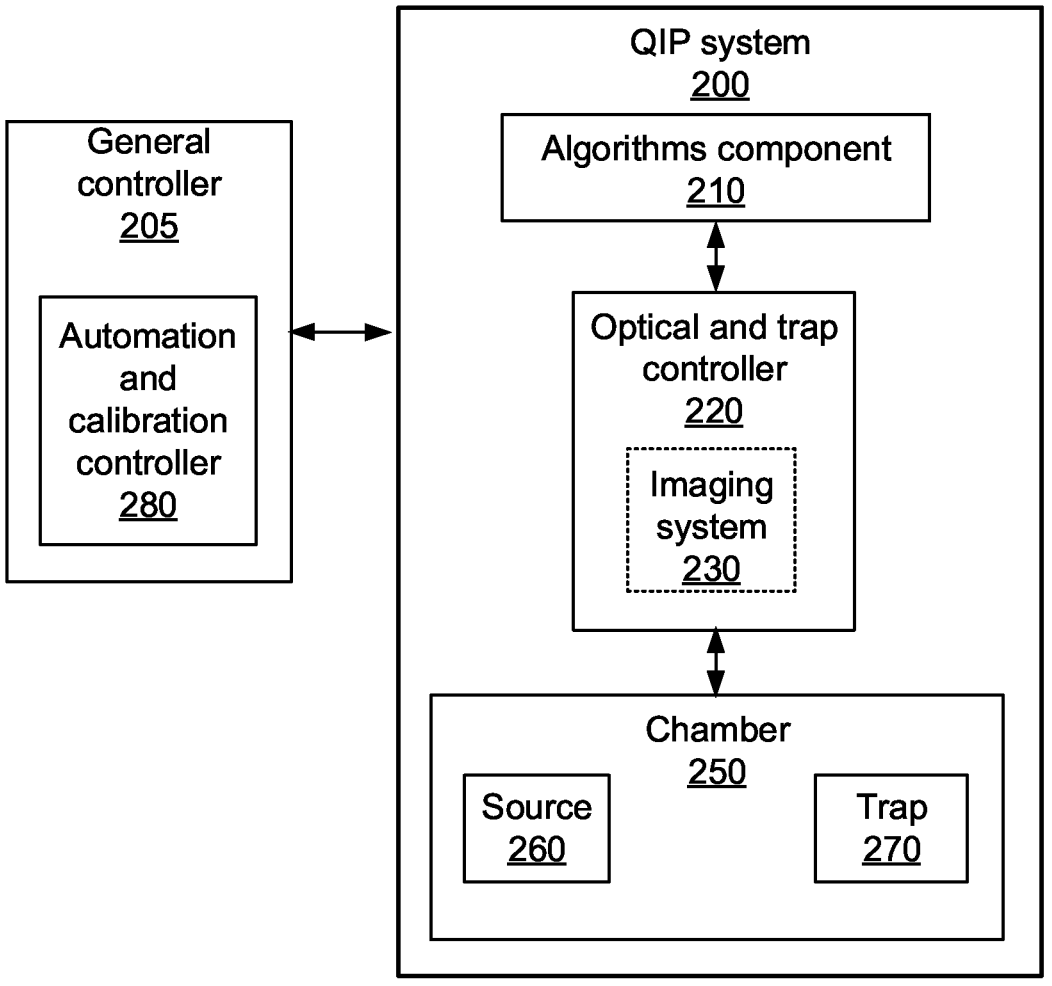
FIG. 2 illustrates an example of a quantum information processing (QIP) system in accordance with aspects of this disclosure.

The present disclosure describes a versatile technique for fabrication of laser-ablation targets (e.g., for use in connection with a source such as the source 260 of FIG. 2) that eliminates the shortcomings of the standard approach to using solid bulk targets of the analyte. This disclosure describes a method of embedding the analyte of interest in an epoxy matrix for use as an ablation target.

In general, the idea of embedding a material into an epoxy itself is not new. For example, in https://arxiv.org/pdf/0706.3374.pdf, entitled Laser ablation loading of a surface-electrode ion trap, a powder of $SrTiO_3$ is embedded into Loctite 5-minute epoxy for a source of $^{88}Sr^+$ ions The technique describes herein, however, is a method for fabricating ablation targets with the ability to (1) finely control the ratio of analyte to epoxy matrix; (2) handle very small amounts of analyte; (3) incorporate analyte that is difficult or dangerous to handle in its solid form; (4) tailor the particular molecular compound of analyte that is mixed with epoxy; and (5) mechanically attach the analyte and matrix mixture onto a substrate/handle with low waste of analyte material. It is also relevant to note that this technique is general and will work with a wide array of analytes and epoxy matrix combinations and will even work for fabrication of a single target containing multiple different analytes in one matrix.

According to an exemplary aspect, the ablation target fabrication technique or process involves the following steps.

(1) The analyte of interest is placed in a receptacle (e.g., an Eppendorf tube) from which a controlled, small amount can be removed (via, e.g., a pipette). If the analyte is dissolved in a liquid solution, the liquid should be evaporated out (either at room or elevated temperature), leaving the solid material behind in the receptacle. The receptacle also serves as a place to perform chemical reactions involving the analyte to, for instance, change the molecular form of the analyte of interest.

As an example, if barium atoms are the desired source, $BaCl_2$ salt may be used directly as the analyte, or first converted to $BaCO_3$ via reaction of $BaCl_2$ with $(NH_4)_2CO_3$ in the Eppendorf tube.

By weighing the receptacle both before anything is put into it and after only solid remains, the total amount of analyte can be determined from knowledge of the analyte's molecular weight.

(2) A controlled and known amount of one component of a multi-part epoxy (via, e.g., pipette) is then added to the solid material in the receptacle. In an exemplary aspect, it is assumed that a two-part epoxy is used, but this technique could be used with an N-part epoxy, with $N \geq 2$, for example. Assuming a two-part epoxy, the two parts are referred to as Part A (e.g., the resin) and Part B (e.g., the hardener). Again, for clarity, it is assumed that Part B is the component added to the receptacle, but more generally the roles of Parts A and B can be swapped or interchanged.

(3) The analyte mixture and Part B are then sonicated to ensure homogeneous mixing. Sonicating refers to subjecting the mixture to ultrasonic vibration.

(4) In some cases (depending on the particular analyte and Part B used), the analyte and Part B mixture are left for any amount of time that is required for dissolution. For some combinations of analyte and Part B mixture, it will take significant time for the analyte to dissolve completely into Part B. If complete dissolution is desired (for instance, to improve the ultimate target homogeneity), the analyte and Part B mixture must be left for a corresponding amount of time. Crucially, since Part A has not yet been added, the matrix/analyte mixture will not cure during this wait time.

(5) The target substrate is then prepared by putting Part A of the epoxy in the desired area of the substrate, using a total mass of Part A that is matched to the amount of Part B that will be used for correct epoxy curing. The amount of Part A used can be determined from the known molecular weight of the Part A material and from weighing the substrate before and after the Part A is deposited. Importantly, the amount of Part A can be put on in stages (with weight measurements taken between stages) to precisely control the amount, since Part A will not cure until it is mixed with Part B. The substrate material can, in principle, be any desired material. However, it should be chosen to bind well to the particular epoxy being used. The substrate can also be designed and fabricated in any desirable shape to facilitate mounting of the target into the laser-ablation system (e.g., as part of the source 260 in FIG. 2).

(6) From the receptacle, a precise amount of Part B/analyte mixture is then removed (via, e.g., pipette) and combined with Part A on the substrate. Crucially, not all of the Part B/analyte mixture needs to be used; only a fraction may be removed if desired, saving the rest for (future) fabrication of more targets. This is particularly advantageous if small amounts of the analyte are very difficult to work with (for example, if larger analyte/ Part B mixtures are easier to prepare), but it is desirable to only use a small amount of analyte for the target. It is also important to note that, since Part B is typically (or can be chosen to be) a liquid, the analyte need not be transferred to the substrate in complete solid form. This is advantageous if the solid form of the analyte is mechanically unstable (for example, if it breaks easily into a very fine powder that can be lost in transfer).

(7) The Part A and Part B/analyte are then mixed together on the substrate with a fine tool (e.g., a needle) to ensure homogeneous mixing and then left for curing (or cure at elevated temperature according to the epoxy's curing recipe). It is important to note here that since the epoxy is mixed on the substrate, there is the opportunity to minimize the amount of lost analyte, since the analyte does not need to be transferred after the mixing process. Otherwise, some of the analyte could harden and bond elsewhere during the transfer process.

(8) The final target of mixed epoxy+analyte+substrate is then weighed to calculate and determine the total analyte mass in the target.

This fabrication technique allows for measurable amounts of analyte in the target and is versatile enough to be able to work with a wide range of analytes and epoxy matrix combinations. It also can produce an ablation target of any desirable shape, based on the substrate design and the how and where the epoxy components are deposited on the target's substrate. The technique also allows for both the total mass of the target material and the ratio of analyte to matrix to be flexibly chosen and precisely controlled, enabling one to tailor the amount of analyte and total target mass to the desired source and its application.

An example of an ablation target is one in which barium atoms are desired as the analyte, and $BaCl_2$ salt may be used directly as the analyte, or first converted to $BaCO_3$ as the analyte via reaction of $BaCl_2$ with $(NH_4)_2CO_3$ in an Eppendorf tube. In such a case, the final target would be of a desired shape and would include epoxy+$BaCl_2$ salt+substrate or epoxy+$BaCO_3$+substrate, for example.

In one exemplary embodiment, 2.5 µL of epoxy part B is added directly to the Eppendorf tube. Using a pipette for the exemplary embodiment, the sample can be drawn into the pipette tip and then redistributed into the Eppendorf tube a plurality of time (e.g., about 50 times) to equally mix the salt in the epoxy. Moreover, in the exemplary embodiment, the epoxy/BaX mixture rests for a predetermined time period (e.g., about 2 weeks) to ensure dissolution of the salt into the epoxy solution. After this predetermined time period, 0.25 µL of the solution were pipetted onto a titanium target containing 500 µg of part A epoxy. Finally, the exemplary embodiment included leaving the finished product on a hot plate for a predetermined time period and at a predefined temperature, e.g., set to 83° C. for one day.

A further example of an ablation target is one in which the desired barium analyte is barium-133.

Figure 3:
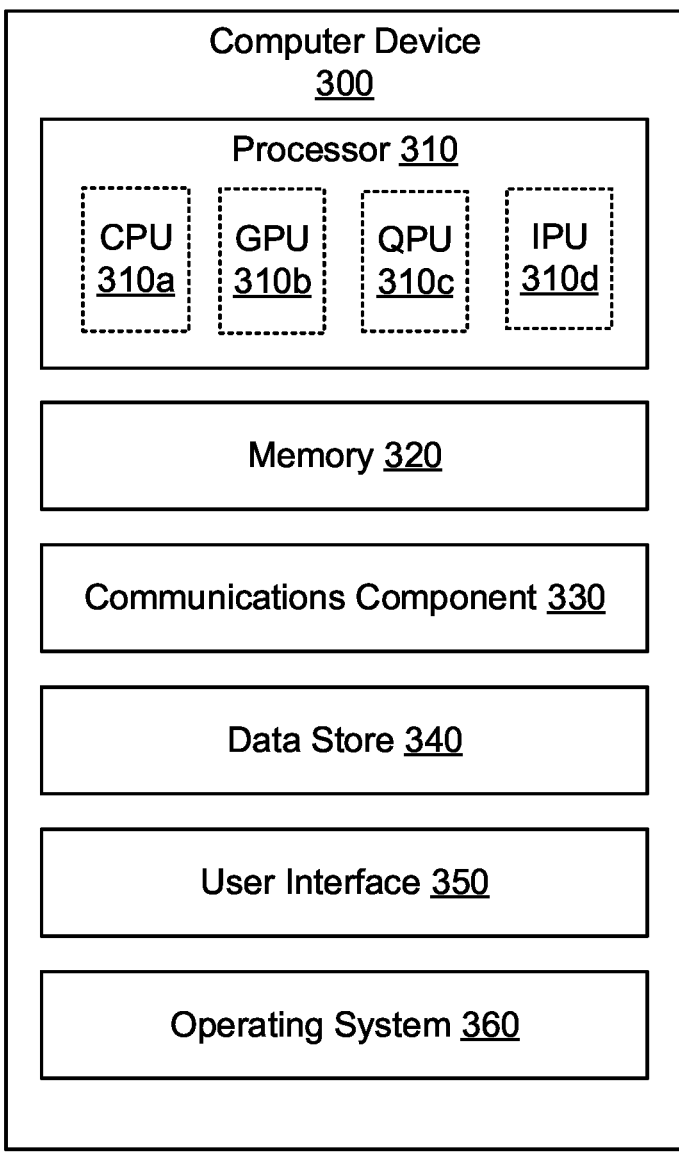
FIG. 3 illustrates an example of a computer device in accordance with aspects of this disclosure.

Embodiments incorporating the above invention are explained in more detail in connection with FIGS. 1-3. FIG. 1. is an example of a chain of trapped atoms/ions that can be created by performing laser-ablation on an ablation target, created using the above invention method, in conjunction with an atomic trap. FIG. 2 provides an exemplary QIP system that can be created from using trapped ions within an atomic trap. FIG. 3. Provides an exemplary quantum computer that can be created from implementing a QIP system with a computer device. A flowchart of the exemplary method in creating ablation targets is given in FIG. 4.

FIG. 1 illustrates a diagram 100 of trapped atomic ions. In this diagram, multiple atomic ions 106 (e.g., atomic ions 106a, 106b, . . . , 106c, and 106d) are trapped in a linear crystal or chain 110 using a trap (the trap can be inside a vacuum chamber as shown in FIG. 2). The trap maybe referred to as an ion trap. The ion trap shown may be built or fabricated on a semiconductor substrate, a dielectric substrate, or a glass die or wafer (also referred to as a glass substrate). The atomic ions 106 may be provided to the trap as atomic species for ionization and confinement into the chain 110.

In the example shown in FIG. 1, the trap includes electrodes for trapping or confining multiple atomic ions into the chain 110 that are laser-cooled to be nearly at rest. The number of atomic ions (N) trapped can be configurable and more or fewer atomic ions may be trapped. The atomic ions can be Ytterbium ions (e.g., $^{171}\text{Yb}^+$ ions), for example. The atomic ions are illuminated with laser (optical) radiation tuned to a resonance in $^{171}\text{Yb}^+$ and the fluorescence of the atomic ions is imaged onto a camera or some other type of detection device.

In this example, atomic ions may be separated by about 5 microns (µm) from each other, although the separation may be smaller or larger than 5 µm. The separation of the atomic ions is determined by a balance between the external confinement force and Coulomb repulsion and does not need to be uniform. Moreover, in addition to atomic Ytterbium ions, neutral atoms, Rydberg atoms, different atomic ions or different species of atomic ions may also be used. The trap may be a linear RF Paul trap, but other types of confinement may also be used, including optical confinements. Thus, a confinement device may be based on different techniques and may hold ions, neutral atoms, or Rydberg atoms, for example, with an ion trap being one example of such a confinement device. The ion trap may be a surface trap, for example.

The atomic ions 106 may be provided as atoms or ions from a source (see e.g., FIG. 2 below) and handled as needed for trapping into a chain. The source may include an ablation target and a laser may be used to provide ablation laser pulses to the ablation target in the source to release the atoms or ions.

FIG. 2 is a block diagram that illustrates an example of a QIP system 200 that can be built to operate around atomic trap 270 and a source 260. Within a chamber 250, source 260 provides atomic species (e.g., a plume or flux of neutral atoms or ions) to the chamber 250 having the trap 270. The source 260 may include an ablation target created using the exemplary method and a laser.

When atomic ions are the basis of the quantum operations, that trap 270 confines the atomic species once ionized (e.g., photoionized) or if provided as ions directly. As discussed above, the atomic ions 106 in the chain 110 in FIG. 1 may be provided as atoms or ions from the source 260 and handled as needed for trapping into the chain 110.

When used to confine or trap ions, the trap 270 may be referred to as an ion trap. The trap 270, however, may also be used to trap neutral atoms, Rydberg atoms, different atomic ions or different species of atomic ions.

The QIP system 200 may include an optical and trap controller 220 that controls various aspects of a trap 270 in chamber 250, including the generation of signals to control the trap 270, and controls the operation of lasers and optical systems that provide optical beams that interact with the atoms or ions in the trap. The lasers and optical systems can be at least partially located in the optical and trap controller 220 and/or in the chamber 250. For example, optical systems within the chamber 250 may refer to optical components or optical assemblies.

The QIP system 200 may include an imaging system 230. The imaging system 230 may include a high-resolution imager (e.g., CCD camera) or other type of detection device (e.g., photomultiplier tube or PMT) for monitoring the atomic ions while they are being provided to the trap 270 and/or after they have been provided to the trap 270. In an aspect, the imaging system 230 can be implemented separate from the optical and trap controller 220, however, the use of fluorescence to detect, identify, and label atomic ions using image processing algorithms may need to be coordinated with the optical and trap controller 220.

The optical and trap controller 220 and/or the imaging system 230 may be linked to the laser in source 260 to control ablation laser pulses to the ablation target in the source 260 to release the atoms or ions into the chamber 250 for trapping by the trap 270.

The QIP system 200 may include an algorithms component 210 that may operate with other parts of the QIP system 200 to perform quantum algorithms or quantum operations, including a stack or sequence of combinations of single qubit operations and/or multi-qubit operations (e.g., two-qubit operations) as well as extended quantum computations. As such, the algorithms component 210 may provide instructions to various components of the QIP system 200 (e.g., to the optical and trap controller 220) to enable the implementation of the quantum algorithms or quantum operations. The algorithms component 210 may receive information resulting from the implementation of the quantum algorithms or quantum operations and may process the information and/or transfer the information to another component of the QIP system 200 or to another device for further processing.

Shown in FIG. 2 is a general controller 205 that can be configured to perform various control operations of the QIP system 200. Instructions for the control operations may be stored in memory (not shown) in the general controller 205 and may be updated over time through a communications interface (not shown). Although the general controller 205 is shown separate from the QIP system 200, the general controller 205 may be integrated with or be part of the QIP system 200. The general controller 205 may include an automation and calibration controller 280 configured to perform various calibration, testing, and automation operations associated with the QIP system 200.

The QIP system 200 may also be referred to as a quantum computing system, a quantum computer, a computer device, a trapped ion system, or the like. The QIP system 200 may be part of a hybrid computing system in which the QIP system 200 is used to perform quantum computations and operations and the hybrid computing system also includes a classical computer to perform classical computations and operations.

The trap 270 may be part of a processor or processing portion of the QIP system 200. That is, the trap 270 may be considered at the core of the processing operations of the QIP system 200 since it holds the atomic-based qubits that are used to perform the quantum operations or simulations. At least a portion of the source 260 may be implemented separate from the chamber 250.

It is to be understood that the various components of the QIP system 200 described in FIG. 2 are described at a high-level for ease of understanding. Such components may include one or more sub-components, the details of which may be provided below as needed to better understand certain aspects of this disclosure.

Referring now to FIG. 3, illustrated is an example of a computer system or device 300 that can be figured in accordance with the QIP system described in FIG. 2. In exemplary aspects, the computer device 300 can represent a single computing device, multiple computing devices, or a distributed computing system, for example. The computer device 300 may be configured as a quantum computer (e.g., a QIP system), a classical computer, or to perform a combination of quantum and classical computing functions, sometimes referred to as hybrid functions or operations. For example, the computer device 300 may be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 may include a processor 310 for carrying out processing functions associated with one or more of the features described herein. The processor 310 may include a single or multiple set of processors or multi-core processors. Moreover, the processor 310 may be implemented as an integrated processing system and/or a distributed processing system. The processor 310 may include one or more central processing units (CPUs) 310a, one or more graphics processing units (GPUs) 310b, one or more quantum processing units (QPUs) 310c, one or more intelligence processing units (IPUs) 310d (e.g., artificial intelligence or AI processors), or a combination of some or all those types of processors. In one aspect, the processor 310 may refer to a general processor of the computer device 300, which may also include additional processors 310 to perform more specific functions (e.g., including functions to control the operation of the computer device 300).

The computer device 300 may include a memory 320 for storing instructions executable by the processor 310 to carry out operations. The memory 320 may also store data for processing by the processor 310 and/or data resulting from processing by the processor 310. In an implementation, for example, the memory 320 may correspond to a computer-readable storage medium that stores code or instructions to perform one or more functions or operations. Just like the processor 310, the memory 320 may refer to a general memory of the computer device 300, which may also include additional memories 320 to store instructions and/or data for more specific functions.

It is to be understood that the processor 310 and the memory 320 may be used in connection with different operations including but not limited to computations, calculations, simulations, controls, calibrations, system management, and other operations of the computer device 300, including any methods or processes described herein.

Further, the computer device 300 may include a communications component 330 that provides for establishing and maintaining communications with one or more parties utilizing hardware, software, and services. The communications component 330 may also be used to carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices. The communications component 330 may be used to receive updated information for the operation or functionality of the computer device 300.

Additionally, the computer device 300 may include a data store 340, which can be any suitable combination of hardware and/or software, which provides for mass storage of information, databases, and programs employed in connection with the operation of the computer device 300 and/or any methods or processes described herein. For example, the data store 340 may be a data repository for operating system 360 (e.g., classical OS, or quantum OS, or both). In one implementation, the data store 340 may include the memory 320. In an implementation, the processor 310 may execute the operating system 360 and/or applications or programs, and the memory 320 or the data store 340 may store them.

The computer device 300 may also include a user interface component 350 configured to receive inputs from a user of the computer device 300 and further configured to generate outputs for presentation to the user or to provide to a different system (directly or indirectly). The user interface component 350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof. In an implementation, the user interface component 350 may transmit and/or receive messages corresponding to the operation of the operating system 360. When the computer device 300 is implemented as part of a cloud-based infrastructure solution, the user interface component 350 may be used to allow a user of the cloud-based infrastructure solution to remotely interact with the computer device 300.

Figure 4:
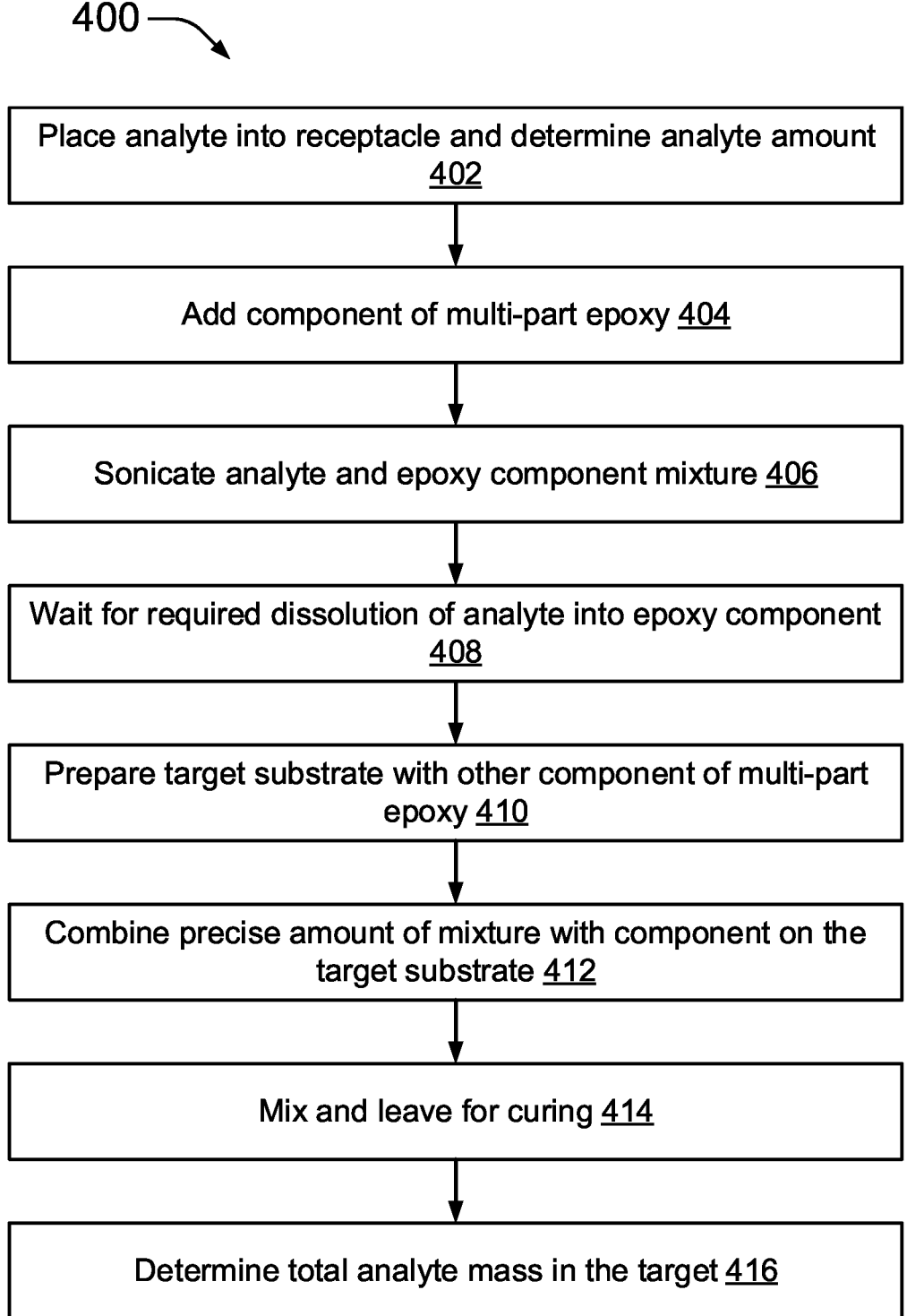
FIG. 4 illustrates an example of a flow for the fabrication of laser-ablation targets in accordance with aspects of this disclosure.

FIG. 4 illustrates an example of a flow chart 400 for the fabrication of laser-ablation targets in accordance with aspects of the method given above. The flow chart 400 includes the steps of first placing the analyte into the receptacle and determining the analyte amount at Step 402. Next, at Step 404, the method includes adding a component of multi-part epoxy and then sonicating the analyte and epoxy component mixture at Step 406. At Step 408, the method includes waiting for the dissolution of the analyte for a predetermined time into an epoxy component and then preparing a target substrate with another component of multi-part epoxy at Step 410. At Step 412, the method includes combining precise or predetermined amounts of the mixture with component on the target substrate, mixing and leaving for curing at Step 414, and then finally determining the total analyte mass in the target at Step 416. It is noted that not all steps are always required in preparing an ablation target (e.g., it may not be necessary in some instances to wait for dissolution of the analyte into an epoxy component, or for the total analyte mass in the target to be determined).

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method for fabrication of a laser-ablation target using an epoxy matrix for sources of atoms and molecules, the method comprising:

placing an analyte into a receptacle and determining an analyte amount in the receptacle;

adding one component of a multi-part epoxy to the receptacle to form an epoxy component mixture with the analyte;

sonicating the epoxy component mixture;

preparing a target substrate with another component of the multi-part epoxy; and removing a portion of the epoxy component mixture from the receptacle and combining the portion with the prepared target substrate; and mixing and leaving for curing the combined portion of the epoxy component mixture and the prepared target substrate.

2. The method of claim 1, further comprising dissolving the analyte in a liquid solution that is evaporated to leave the analyte in a solid form.

3. The method of claim 1, further comprising causing a chemical reaction to be performed within the receptacle to change a molecular form of the analyte.

4. The method of claim 1, wherein the multi-part epoxy is a two-part epoxy.

5. The method of claim 1, further comprising leaving the analyte and the epoxy component mixture for an amount of time required for dissolution of the analyte into the epoxy component mixture.

6. The method of claim 1, further comprising preparing the target substrate in a plurality of stages.

7. The method of claim 1, further comprising fabricating the target substrate in a desirable shape to facilitate mounting of the target substrate into a laser-ablation system.

8. The method of claim 1, further comprising determining a total analyte mass in the target substrate.

9. The method of claim 1, wherein the analyte is $BaCl_2$ or $BaCO_3$.

10. The method of claim 1, wherein the analyte is a source of barium.

11. The method of claim 1, wherein the analyte is a source of barium-133.

12. The method of claim 1, wherein the one component of the multi-part epoxy is a resin and the other component of the multi-part epoxy is a hardener.

13. A quantum information processing (QIP) system comprising a laser-ablation target fabricated in accordance with the method claim 1.

14. A method for fabrication of a laser-ablation target, the method comprising:

adding a first component of a multi-part epoxy to a solid analyte in a receptacle;

sonicating the solid analyte and the first component of the multi-part epoxy for homogeneous mixing of the solid analyte and the first component;

preparing a target substrate with a second component of the multi-part epoxy; and combining the homogeneous mixing of the solid analyte and the first component of the multi-part epoxy with the prepared target substrate;

mixing and curing the combined the homogeneous mixing and the prepared target substrate; and determining a total analyte mass by weighing a final target of the mixed and cured combined homogeneous mixing and the prepared target substrate.

15. The method of claim 14, further comprising placing an analyte into the receptacle and dissolving the analyte in a liquid solution to leave the solid analyte.

16. The method of claim 14, further comprising causing a chemical reaction to be performed within the receptacle to change a molecular form of the analyte.

17. The method of claim 14, further comprising preparing the target substrate in a plurality of stages.

18. The method of claim 14, wherein the analyte is a source of barium-133.

19. The method of claim 14, wherein the first component of the multi-part epoxy is a hardener and the second component of the multi-part epoxy is a resin.

20. A quantum information processing (QIP) system comprising a laser-ablation target fabricated in accordance with the method claim 14.

* * * * *